United States Patent [19]

McLaughlin

[11] 4,273,161

[45] Jun. 16, 1981

[54] INSULATED PLASTIC PIPE PRODUCT AND METHOD

[75] Inventor: Hugh T. McLaughlin, Santa Ana, Calif.

[73] Assignee: Ameron, Inc., Monterey Park, Calif.

[21] Appl. No.: 632,571

[22] Filed: Nov. 17, 1975

Related U.S. Application Data

[60] Division of Ser. No. 612,659, Sep. 12, 1975, which is a continuation of Ser. No. 513,481, Oct. 9, 1974, abandoned.

[51] Int. Cl.³ .............................................. F16L 9/14
[52] U.S. Cl. .................................. 138/149; 29/421 R; 29/450
[58] Field of Search ................... 138/144, 149; 29/421, 29/450, 451, 157

[56] References Cited

U.S. PATENT DOCUMENTS

| | | | |
|---|---|---|---|
| 2,906,317 | 9/1959 | Keyes | 138/149 X |
| 3,080,268 | 3/1963 | Bjork | 138/149 X |
| 3,216,459 | 11/1965 | Schroeder et al. | 138/149 X |
| 3,429,758 | 2/1969 | Young | 138/144 X |
| 3,483,896 | 12/1969 | Grosh | 138/144 X |
| 3,552,445 | 1/1971 | Andrews | 138/149 X |
| 3,651,661 | 3/1972 | Darrow | 138/149 X |
| 3,665,968 | 5/1972 | De Putter | 138/149 X |
| 3,677,303 | 7/1972 | Martin | 138/149 X |
| 3,695,483 | 10/1972 | Pogorski | 138/149 X |
| 3,728,187 | 4/1973 | Martin | 138/149 X |
| 3,830,899 | 8/1974 | Piccioli et al. | 138/149 X |
| 3,921,273 | 11/1975 | Kondo et al. | 29/451 X |
| 3,930,568 | 1/1976 | Levey | 138/149 X |
| 3,941,159 | 3/1976 | Toll | 138/149 X |

Primary Examiner—James E. Bryant, III
Attorney, Agent, or Firm—Christie, Parker & Hale

[57] ABSTRACT

An insulated pipe for conducting high and low temperature fluids includes a rigid carrier pipe, a layer of volumetrically compressible insulating material around the O.D. of the carrier pipe, and a protective outer pipe around the insulating layer. The method of making the pipe product includes placing a closed flexible bag around the carrier pipe and the insulating layer, and then drawing a vacuum on the interior of the bag to compress the insulating layer. The outer pipe is slid lengthwise over the compressed insulating layer, and the vacuum is then removed to allow the insulation to partially expand and fill the annulus between the carrier pipe and the outer pipe.

7 Claims, 3 Drawing Figures

INSULATED PLASTIC PIPE PRODUCT AND METHOD

CROSS REFERENCE TO RELATED APPLICATIONS

This is a division of application Ser. No. 612,659, filed Sept. 12, 1975, which, in turn, is a continuation of application Ser. No. 513,481, filed Oct. 9, 1974 now abandoned.

BACKGROUND

This invention relates to insulated pipe and a method for making such pipe.

Piping systems for conducting high and low temperature fluids generally include an inner carrier pipe for conducting the fluid, a layer of insulation surrounding the O.D. of the carrier pipe, and a tubular outer jacket or shell around the insulating layer. The insulation provides a low thermal conductivity layer around the carrier pipe to maintain steady temperatures within the fluid being conducted. The outer jacket or shell protects the insulation against water absorption.

In one prior art method of making insulated pipe, a polyvinyl chloride outer shell is extruded around the carrier pipe, and a foam insulating layer is injected into the annulus between the extruded shell and the carrier pipe in a continuous process. This process is time consuming and it requires costly equipment to carry out the continuous process. Moreover, the extrusion process limits the pipe to the use of thermoplastics for the outer shell which are limited in their temperature capabilities.

In another prior art method of making insulated pipe, the insulation layer is made from fiberglass felt. It is common practice to increase the density of the fiberglass felt by impregnating the glass fibers with resin, and then compacting the felt within the heated mold to cure the resin. This produces a rigid fiberglass layer of the desired shape and high density. The increased density is desirable because of the added thermal resistance to heat flow desired for a given thickness of insulation. The rigid fiberglass layer usually is molded in semi-circular shaped half shell blocks which are attached to the O.D. of the carrier pipe. The outer jacket or shell is then placed around the fiberglass blocks. It is difficult to slide a rigid tubular outer shell lengthwise along the O.D. of the rigid fiberglass blocks and have the insulating layer completely fill the annular space between the carrier pipe and the shell. This problem can be avoided by extruding an outer shell around the insulation layer, but this has the disadvantages of being costly, time consuming, and temperature-limiting as discussed above.

SUMMARY

This invention provides a method of making insulated pipe which eliminates the need for extruding an outer protective shell around the insulation layer. The method also provides a relatively high density insulation layer without the costly, time consuming steps of molding the fiberglass resin and then applying heat to cure the resin.

Briefly, the method includes wrapping a layer of volumetrically compressible insulating material around the exterior of a rigid carrier pipe, and then placing a closed flexible tube around the carrier pipe and the insulation layer. A vacuum is then drawn on the interior of the tube to compress the insulation around the exterior of the carrier pipe. A rigid outer shell is slid lengthwise over the compressed insulation layer and the carrier pipe. After the outer shell is in place, the vacuum is removed to allow the insulation to expand and fill the space between the carrier pipe and the inner surface of the shell.

The invention also provides a novel insulated pipe construction which includes a rigid carrier pipe, an outer shell disposed concentrically around and spaced from the carrier pipe, a partially compressed, volumetrically deformable, resilient insulation layer in the space between the carrier pipe and the outer shell, and a layer of flexible, imperforate material between the outer shell and the insulating layer.

These and other aspects of the invention will be more fully understood by referring to the following detailed description and the accompanying drawings.

DRAWINGS

DESCRIPTION

Figure 1:
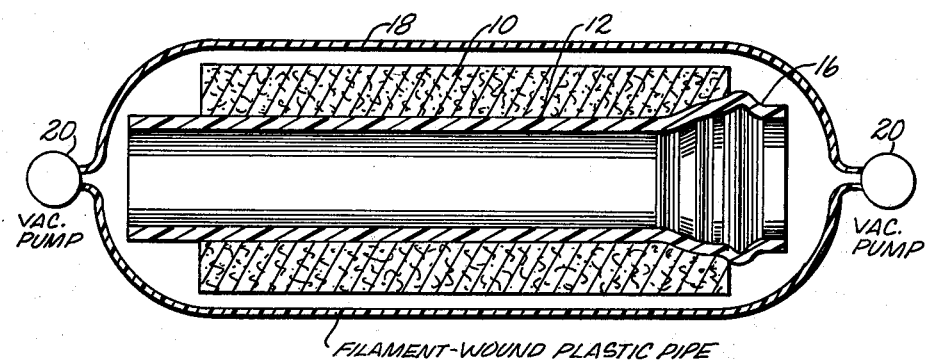
FIG. 1 is a schematic cross-sectional elevation view illustrating a method according to this invention for compressing an insulating layer applied to the O.D. of a carrier pipe.

Referring to FIG. 1, a layer 10 of volumetrically compressible insulating material is initially wrapped around the exterior of an elongated carrier pipe 12. The carrier pipe 12 is preferably the type of pipe generally used in conducting low temperature or high temperature fluids under pressure. Such pipe can be made from extruded thermoplastic such as polyvinyl chloride, although it is presently preferred that such pipe be filament-wound plastic pipe made from thermosetting resinous materials. Filament-wound plastic pipe is well known in the art. Such pipes are commonly formed from suitable filamentary material by continuously winding the filaments around a removable mandrel, the filaments being impregnated with a curable resinous material, followed by curing of the structure and removal of the mandrel. The pipe is shown with a spigot end 14 and a bell end 16 for the purpose of joining several sections of the pipes 12 to form a suitable high pressure piping system.

The insulation layer 10 preferably comprises a layer of volumetrically compressible fiberglass insulating felt which is wrapped around the O.D. of the carrier pipe and then held on the pipe by stapling the insulation together, although a band of tape (not shown) can be used, or the insulation layer can be bonded to the O.D. of the carrier pipe. Other types of insulation material also can be used, such as polyurethane foam, or other porous, resilient foam materials, so long as the insulation layer provides the desired low thermal conductivity, and is volumetrically compressible.

The entire carrier pipe and insulation layer are enclosed in the hollow interior of a flexible, imperforate tube 18, or other suitable flexible sheet or film which is capable of encasing the carrier pipe and the insulation layer for the purpose of drawing a vacuum around them. As shown best in FIG. 1, the tube 18 has a normal inside diameter which is greater than the O.D. of the insulation layer 10 when the latter, in its uncompressed condition, is wrapped around the carrier pipe 14. In the preferred application, the tube 18 is a flexible polyethylene bag, at least one end of which is connected to a vacuum pump 20. Although the drawing shows both ends of the polyethylene bag connected to separate vacuum pumps, the presently preferred method is to draw a vacuum from only one end of the bag, while the other end of the bag is closed, such as by tying or sealing the end of the bag to provide an air-tight enclosure around the carrier pipe and the insulation layer.

Figure 2:
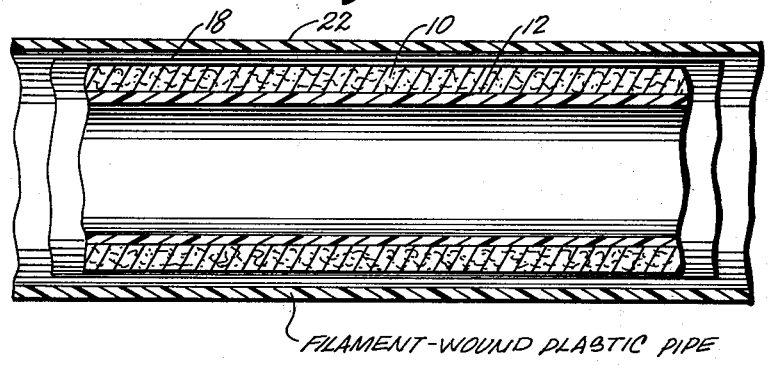
FIG. 2 is a fragmentary schematic cross-sectional elevation view illustrating an outer pipe placed around the compressed layer of insulation.

As illustrated in FIG. 2, one or both of the vacuum pumps pulls a partial vacuum on the interior of the bag 18 so that atmospheric pressure will compress the volumetrically compressible layer of insulation. The vacuum compresses the layer a sufficient amount to allow a rigid outer tube or shell 22 to be slid lengthwise over the plastic bag and the insulation layer. A large vacuum pump is not necessary, since only about five inches of vacuum (thirty inches being total vacuum) is necessary to produce the required compression. In fact, suitable compression for normal commercial length pipe sections can be produced simply by using the vacuum pump from a conventional vacuum cleaner.

Figure 3:
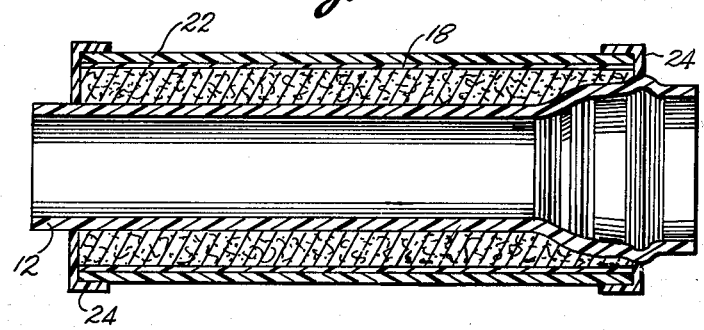
FIG. 3 is a schematic cross-sectional elevation view illustrating the finished insulated pipe of this invention.

Preferably, the outer pipe 22 is a filament-wound plastic pipe made from a thermosetting resinous material, although the plastic pipe can be any other type of rigid pipe which is of light weight construction and capable of protecting the insulation layer 12 from water absorption and other damage such as abrasion. When the outer pipe and inner carrier pipe are properly aligned, the vacuum is broken, preferably by cutting the two ends of the plastic bag 18, to allow the compressed insulation layer to expand and fill the annulus between the two pipes. Preferably, the thickness of the insulation layer is chosen such that the I.D. of the outer pipe 22 is less than the O.D. of the uncompressed insulation layer shown in FIG. 1, and therefore is less than the I.D. of the tube 18 in its normal uncompressed condition shown in FIG. 1. Thus, the compressed insulation only partially recovers to its normal uncompressed condition when the vacuum is broken, so that the insulation layer remains in a partially compressed condition in the annulus between the carrier pipe 14 and the outer pipe 22, as shown in FIG. 3. This provides means for adjusting the desired density of the insulation layer in the annulus.

Once the insulation layer is in place, the ends of the plastic bag can be trimmed appropriately and end seals 24 can be added to the ends of the pipe to provide the required protection against water absorption.

Thus, the method of this invention produces insulated pipe without requiring the expensive and time consuming prior art steps of extruding the outer shell and injecting foam insulation in a continuous process. Moreover, since the outer pipe 22 can be made in a separate process, the outer pipe can be a filament-wound plastic pipe made from thermosetting resinous materials which do not have the temperature limitations of thermoplastics. Further, the prior art process of molding the insulation layer in rigid half-shell blocks is eliminated. This avoids the need for adding resins to the fiberglass felt and then heating the resin in a mold to cure the resin. The insulated pipe provided by this invention also has the advantage of providing an insulating layer between the inner and outer pipes, which will allow a vacuum to be easily drawn on the insulating layer in the event such measures are necessary to reduce heat transfer for special low thermal conductivity applications.

I claim:

1. An insulated pipe construction comprising a rigid carrier pipe, a rigid tubular outer shell disposed concentrically around and spaced from the carrier pipe, a partially compressed, volumetrically deformable insulation layer in the space between the carrier pipe and the outer shell, and a flexible, imperforate tube normally having an inside diameter greater than that of the outer shell encasing the insulation layer and embedded between the outer shell and the partially compressed insulation layer.

2. Apparatus according to claim 1 in which the outer shell is a rigid filament-wound plastic pipe made from a thermosetting resinous plastic material.

3. Apparatus according to claim 2 in which the carrier pipe is a filament-wound plastic pipe made from a thermosetting resinous plastic material.

4. Apparatus according to claim 1 in which the insulation layer comprises flexible fibrous insulating felt.

5. Apparatus according to claim 1 in which the insulation layer comprises a porous resilient foam material.

6. Apparatus according to claim 1 in which the imperforate tube comprises a substantially, flexible plastic film which, in bag form, is capable of being evacuated to radially inwardly compress the O.D. of the deformable insulation layer.

7. Apparatus according to claim 5 in which the flexible imperforate tube is held in contact with the inside of the outer shell by radial outward pressure of the partially compressed insulation layer.

* * * * *